W. Boynton,
Barrel Faucet.
N° 56,889. Patented Aug. 7, 1866.
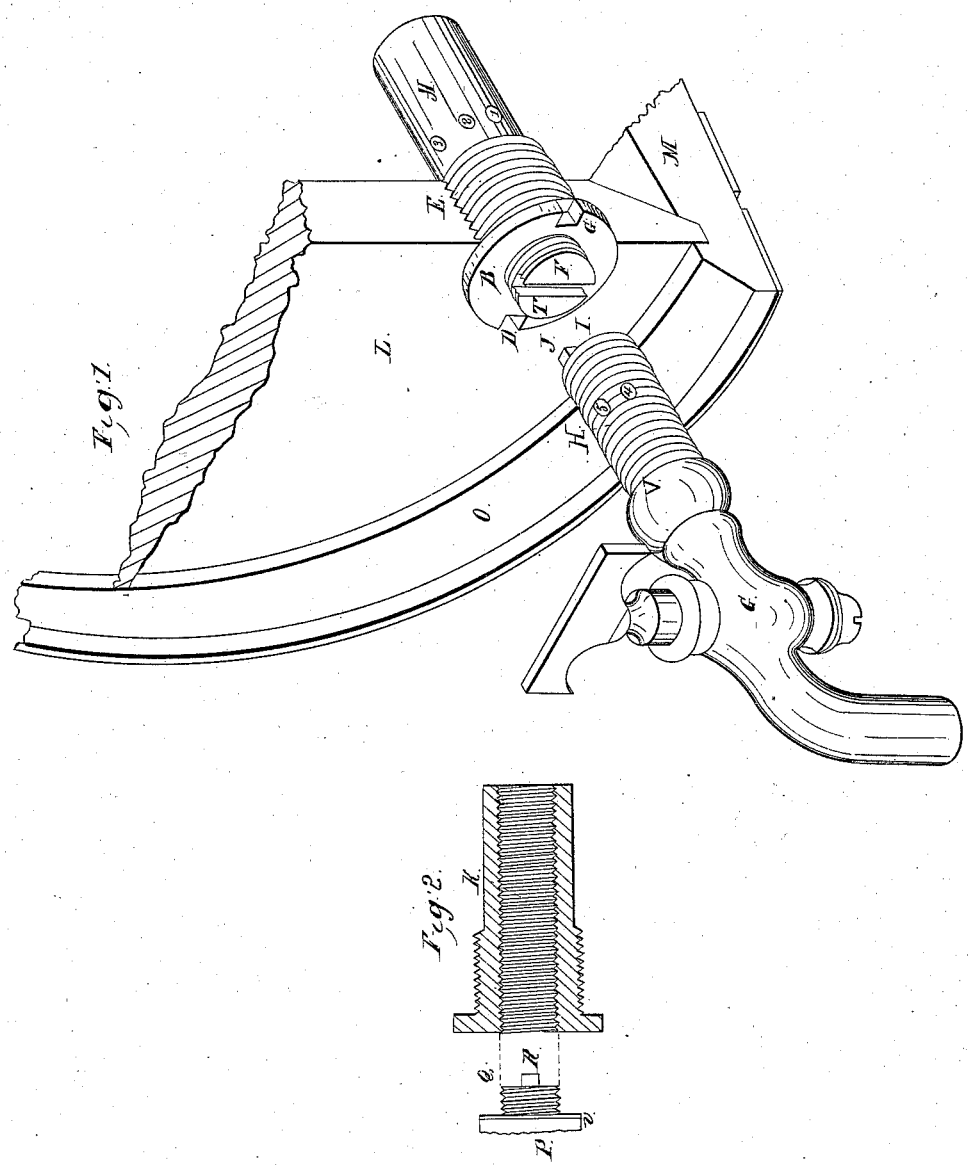
Witnesses:
A. Babbitt
Joseph Rea.
Inventor:
William Boynton

UNITED STATES PATENT OFFICE.

WILLIAM BOYNTON, OF AUBURN, NEW YORK.

IMPROVEMENT IN TAPPING BARRELS.

Specification forming part of Letters Patent No. 56,889, dated August 7, 1866.

*To all whom it may concern:*

Be it known that I, WILLIAM BOYNTON, of the city of Auburn, Cayuga county, New York, have invented a new and Improved Mode of Tapping Barrels or Casks containing fluid of any kind; and I do hereby declare the following to be a full, clear, and exact description of the same, reference being had to the accompanying drawings, making a part of this specification, and to the letters of reference marked thereon.

It is well known to all persons who find it necessary to open casks containing liquids of various kinds that great difficulty is often experienced in inserting a cock or faucet into the cask or barrel for the purpose of drawing the same without losing more or less of the liquid in the operation. This is especially true of malt liquors, some kinds of which are generally at such times in a high state of fermentation or effervescence, and on that account difficult to control.

Now, the object of this invention is to avoid all difficulty of this kind by affixing in the head of such cask or barrel a device arranged in such manner that the faucet may be inserted into the liquor or removed therefrom without any of the difficulties above mentioned; and in order that others skilled in the art may know how to make and use my invention, I will proceed to describe its construction and mode of operation.

Figure 1 shows the device inserted into the head of the cask. Fig. 2 is a longitudinal section of the same, and it shows, also, the sealing-plug P.

In Fig. 1, A is a thimble, having a flange, B, making a part of the same, and designed to be screwed against the head of the cask by inserting a screw-driver or wrench into the two notches C and D, and turning the thimble into a hole of suitable size made in the head of the cask preparatory thereto. The screw-thread E is cut on the said thimble about one inch in length, for the purpose of holding the thimble firmly in the head. The plug F has a screw-thread cut upon its surface, and a corresponding thread is also cut upon the inner surface of the thimble A, said thread and screw running the entire length of said thimble, as shown at K, Fig. 2. On the end of the faucet G is also a screw-thread, H, of the same number of threads to the inch as is cut on the plug F. The hole in the end of the faucet, at I, is closed air-tight. Projecting from the end of the faucet is a tenon, J.

In Fig. 1, L is the cask-head, M the staves, and O the chine.

In Fig. 2, P is a sealing-plug, having a screw-thread, Q, cut thereon the same as on the plug F, Fig. 1. From out the end of said plug is projected a tenon, R, and on the opposite end is cut a notch, S, for inserting a screw-driver for turning the plug into its place. Immediately after the faucet is removed, as represented in Fig. 1, the tenon R on the plug P is inserted into the opening T in the plug F, and by aid of the screw-driver the sealing-plug will drive the plug F into the thimble a distance sufficient to allow the packing U, on the forward end or side of the sealing-plug P, to come firmly onto the end of the thimble A, which will hermetically seal the same against any leakage.

Now, when the faucet or cock is to be put in for the purpose of drawing the contents of the cask, the tenon J on the end of the faucet is inserted into the opening T in the plug F, and the faucet turned round or screwed into the thimble A, drawing the plug F before it, until the shoulder on the faucet G comes firmly against the face of the flange B on the thimble A. In the process of screwing in the faucet the plug F is driven beyond the apertures 1 2 3 in the thimble A, (said apertures open into the space K, Fig. 2,) and when the shoulder V of the faucet G comes against the flange B of the thimble A the apertures 4 5, &c., in the faucet will come opposite to and in line with the apertures or openings 1 2 3, &c., in the thimble A. This aperture lets the liquid into the faucet, and may be drawn by aid of the same at pleasure.

In removing the faucet, it requires to be turned in the opposite direction. As it comes out it brings with it the plug F, which, as it comes forward, closes the apertures 1 2 3, &c., in the thimble A, and the faucet can be withdrawn and inserted without allowing the liquid to flow at all from the cask. If the plug F does not close the aperture wherein is inserted the faucet sufficiently tight, the sealing-plug P may be put in, as before described.

Now I have assayed, constructed, and shown such number and form of devices as appear to me to be best; but I do not wish to be confined to those above described, because any number of modifications may be used without varying from or altering the principle of my invention, the essence of which consists in shutting off the fluid contents of any cask or barrel from the aperture into which is to be inserted the faucet or cock, or from which the same is to be removed, for the purpose of taking out or putting in the said faucet without allowing the contents of the cask to escape.

It should be understood that the thimble A, with its screw E and flange B, is to be screwed into the head of the cask L preparatory to filling the same, and is to be kept therein as long as the cask is used, for the purpose described.

I do not claim anything embraced in the patent to William Pinkerman of November 12, 1862; but, Having above described the construction and mode of operating my invention, what I claim as new, and wish to secure by Letters Patent, is—

1. The solid plug F, for shutting off the contents of the cask, as above set forth.

2. Closing the end of the faucet G by means of a solid plug, and projecting therefrom the tenon J, for the purpose above specified.

3. The apertures in the thimble A, marked 1 2 3, and the corresponding apertures in the screw portion of the faucet H, marked 4 5, &c., when used as and for the purpose specified.

WILLIAM BOYNTON.

Witnesses:
 JOSEPH REA,
 AVERY BABBETT.